GLASS & BARTOL.
Centrifugal Sugar Draining Machine.
No. 47,714. Patented May 16, 1865.
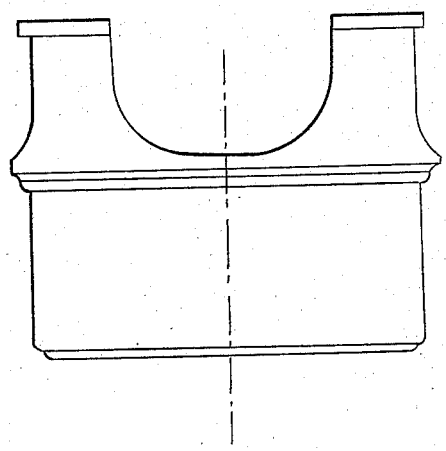
Fig. 2.
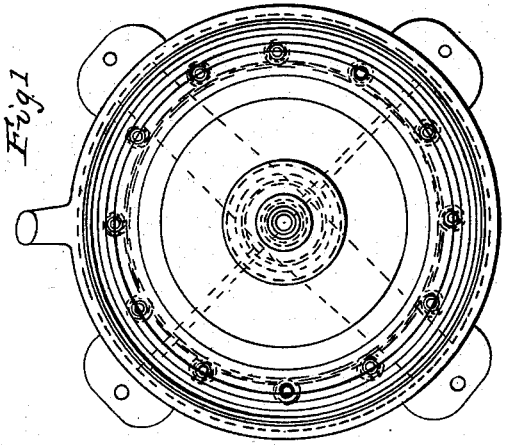
Fig. 1.
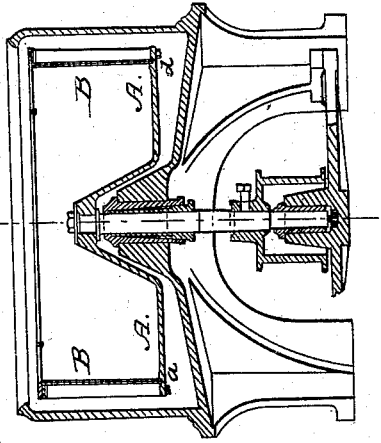
Fig. 4.
Fig. 3.
Witnesses
Inventor
Alexander W. Glass & Henry W. Bartol.
By their attorney, N.B. Houghton.

UNITED STATES PATENT OFFICE.

ALEXANDER N. GLASS AND HENRY W. BARTOL, OF PHILADELPHIA, PA.

IMPROVED CENTRIFUGAL DRAINING-MACHINE.

Specification forming part of Letters Patent No. 47,714, dated May 16, 1865.

*To all whom it may concern:*

Be it known that we, ALEXANDER N. GLASS and HENRY W. BARTOL, of the city of Philadelphia, in the State of Pennsylvania, have made certain new and useful Improvements in Centrifugal Sugar-Draining Machines; and we do hereby declare the following to be a full, clear, and exact description of the same, reference being had to the accompanying drawings, making a part of this specification, in which—

Figure 1 represents a top plan of a centrifugal sugar-drying machine. Fig. 2 represents an external view of the tank or vat. Fig. 3 represents a vertical central section through the machine; and Fig. 4 represents a similar section, though on an enlarged scale, of the revolving draining-screen.

Similar letters of reference, where they occur in the separate figures, denote like parts of the apparatus in all the drawings.

In centrifugal draining or drying machines as at present constructed, the wire-gauze which constitutes the perimeter of the revolving drier is simply set on or against the bottom plate. In removing the sugar from the drier with scoops such as are used for the purpose, the wire-gauze is turned up or damaged, so that in a very short time it is rendered useless, as the sugar and molasses will drive through or under it, and it must be removed and replaced, at considerable expense, with new material. To attempt to prevent this damage to the wire-gauze by the scoops by placing an ordinary shield there produces another evil—namely, the preventing of the molasses, or what is called the "smear," from reaching the gauze and passing through it.

Our invention consists in so uniting or placing the wire-gauze in relation to the bottom plate of the revolving draining-cylinder as that the scoop for taking out the sugar cannot turn up or go under the bottom of the wire-gauze, or damage it in any way, while we do not impede the free passage of the molasses to the wire-gauze or retain any of it in the cylinder or on the bottom plate, thus making a very great saving in the expense of repairs incident to the machines as at present constructed.

To enable others skilled in the art to make and use our invention, we will proceed to describe the same with reference to the drawings.

In Fig. 3 the machine is shown in section and in detail, and in its general characteristics resembles the machines now in use. Our improvement, however, is therein seen; but as Fig. 4, which is drawn on a larger scale, more distinctly shows our improvement, we will more particularly describe it in connection with that figure, in which A represents the bottom plate of the revolving cylinder, and B the wire-gauze, through which the liquid is forced or driven by the centrifugal action thereof. Near the perimeter of the bottom plate, as at $a$, we propose to thicken the metal by a gradual inclined or curved plane on its upper or under surface, and to form in said thickened or raised portion a groove or gain, into which the wire-gauze may set, so that in scooping out the sugar the scoop may not get underneath or mar the wire-gauze. The raised portion, if on top of the bottom plate, should not be abrupt, as it would leave a shoulder, over which the molasses would not rise; but the rise should be gentle, and the centrifugal force would then be sufficient to flow the liquid over it and against the wire-gauze. The increased thickness of metal, so as to form a groove in it, may be entirely on the under side of the bottom plate, as shown by the dotted red lines to the left of Fig. 4, and the groove cut on the level surface of the plate. This would allow the liquid to flow freely over the bottom plate and against the wire-gauze without its surmounting any elevation, and would protect the lower part of the wire-gauze from injury by the scraper; and though we have called it a "groove" or "gain," we mean by those terms a recess of any kind into which the bottom of the wire-gauze cylinder may set, and be protected from the instrument with which the sugar is taken or scooped out.

We have mentioned wire-gauze only as the material used; but should finely-prepared metal plated be used instead, the same advantages would accrue by our proposed plan of holding and protecting them; nor do we propose to confine our invention exclusively to machines for draining or drying sugar, as it s applicable to all centrifugal machines for draining or drying any other material.

Having thus fully described the nature, object, and purpose of our invention, what we claim therein as new, and desire to secure by Letters Patent, is—

In centrifugal draining or drying machines, the thickening of the perimeter of the bottom plate of the revolving cylinder, and forming a groove, recess, or shoulder therein, so that the bottom of the wire-gauze cylinder may rest therein, and below the surface over which the instrument is moved in scooping out the sugar, by which means it is protected from injury, substantially as herein described.

ALEXANDER N. GLASS.
   H. W. BARTOL.

Witnesses:
 RICHD. V. NEWSHAM,
 SAML. SAYRE, Jr.